(No Model.)
L. S. & M. J. B. EARLY.
STALK CUTTER.
No. 280,590. Patented July 3, 1883.
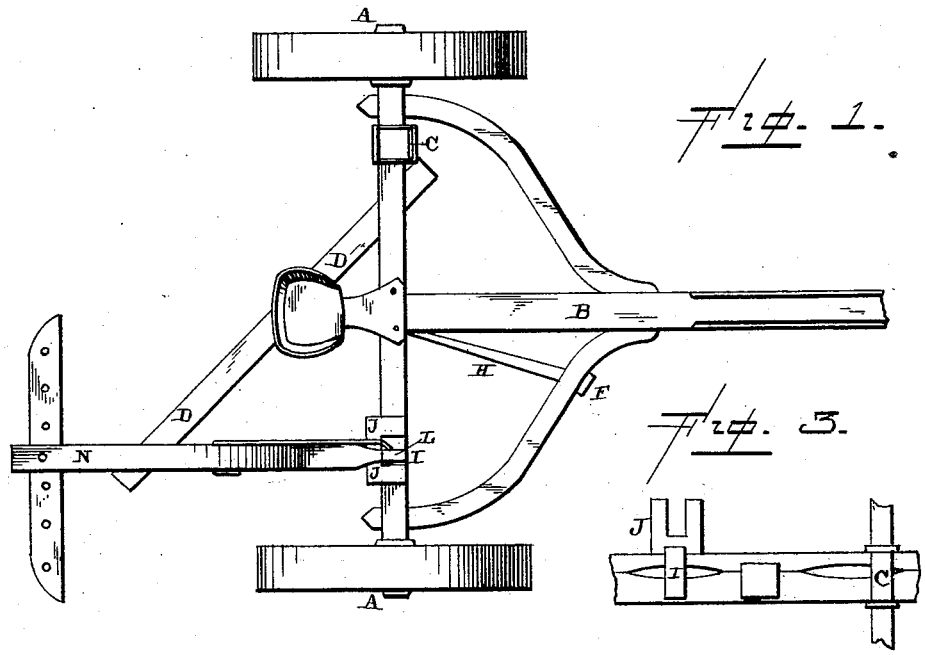
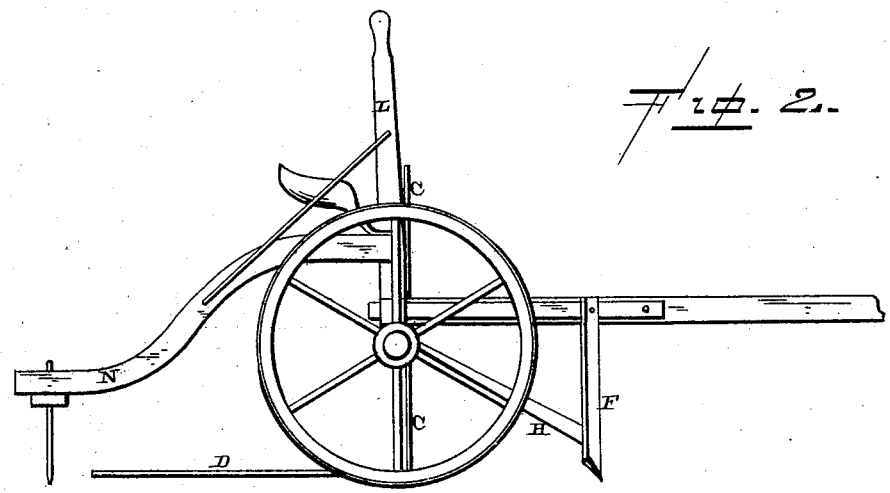
Witnesses.
Louis F. Gardner
J. W. Garner
Inventor.
L. S. Early,
M. J. B. Early,
per
F. A. Lehmann, Atty.

UNITED STATES PATENT OFFICE.

LOUIS S. EARLY AND MATTHIAS J. B. EARLY, OF LADONIA, TEXAS.

STALK-CUTTER.

SPECIFICATION forming part of Letters Patent No. 280,590, dated July 3, 1883.

Application filed March 5, 1883. (No model.)

*To all whom it may concern:*

Be it known that we, LOUIS S. EARLY and M. J. B. EARLY, of Ladonia, in the county of Fannin and State of Texas, have invented certain new and useful Improvements in Stalk-Cutters; and we do hereby declare the following to be a full, clear, and exact description of the invention, such as will enable others skilled in the art to which it pertains to make and use it, reference being had to the accompanying drawings, which form part of this specification.

Our invention relates to an improvement in stalk-cutters; and it consists in the combination of a suitable frame, which is drawn along by two horses, so as to straddle a row of plants, a diagonal guide for guiding the plants, a guiding finger or piece for guiding the plants toward the knife, and a rake for raking the plants in piles or heaps as fast as they are cut, all of which will be more fully described hereinafter.

The object of our invention is to provide a machine which can be driven along over the rows of plants, and which will not only cut the plants down, but will rake them in piles.

Figure 1 is a plan view of our invention. Fig. 2 is a side elevation of the same. Fig. 3 is a detail view.

A represents a two-wheeled vehicle of any suitable construction, and which is provided with the tongue B for two animals, and which vehicle is intended to be drawn across the field, so as to straddle a row of cotton or other plants.

Clamped to the front of the axle by any suitable means, and to the bolster, which is placed upon the axle, is the vertical standard C, which has secured to its lower end, in any suitable manner, the horizontal knife or cutter D. This knife extends diagonally backward, and is made to move along just above the top of the ground and to cut the stalks down as the machine is drawn across the field. This knife will be given any desired shape that will best adapt it for the purpose intended, and will be made to slant more or less backward, as may be found necessary.

In order to catch the stalks and move them toward the knife and hold them upward, so that the knife will be brought in more direct contact with them, the hanger F is provided, which is secured to one of the hounds of the tongue. Extending backward from the lower end of this hanger, which will preferably have its lower end shortened, is a finger or guiding device, H, which, by its inclined position, serves to raise the plants upward after the hanger has caught under them. By thus raising the plants upward they are moved toward the knife, so it will give them a direct cut, and thus sever them from the ground.

In order to rake the plants, as fast as they are cut, into piles, there is a sliding block, I, secured between the axle and the bolster upon its top, or in a slot made through the axle, and to this slide is secured the standard or support J, which is movable laterally with the slide.

Pivoted in the top of the standard is the operating-lever L and the rake-beam N, these two parts being formed either in a single piece or in two pieces, and then braced rigidly together. The rake-teeth run along the ground just in the rear of the knife, and rake together the plants in piles as fast as they are cut. Whenever the pile begins to grow too large, the driver has but to push forward on the lever, when the rake will be raised upward, and thus liberated from the cut plants.

It will be seen from the above that it is only necessary to drive our machine across the field upon which there are old cornstalks or cotton-plants, and that the plants will be cut and raked into piles at the same time with little or no effort upon the part of the driver.

Having thus described our invention, we claim—

In a stalk-cutter, the combination of the vehicle provided with the devices F H for raising the stalks, the diagonal cutter D, which sweeps along the ground, the rake N, and a lever for raising and lowering the rake, substantially as shown.

In testimony whereof we affix our signatures in presence of two witnesses.

LOUIS SIMEON EARLY.
MATTHIAS JOHN BOURLAND EARLY.

Witnesses:
C. V. EASTMAN,
JNO. S. CLINTON.